(12) United States Patent
Sakayori et al.

(10) Patent No.: US 11,858,574 B2
(45) Date of Patent: Jan. 2, 2024

(54) STEERING CONTROL DEVICE AND STEERING CONTROL METHOD

(71) Applicant: Hitachi Automotive Systems, Ltd., Hitachinaka (JP)

(72) Inventors: Go Sakayori, Tokyo (JP); Junya Takahashi, Tokyo (JP); Hiroshi Nakano, Hitachinaka (JP); Tomoaki Fujibayashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 502 days.

(21) Appl. No.: 15/734,456

(22) PCT Filed: Mar. 1, 2019

(86) PCT No.: PCT/JP2019/008207
§ 371 (c)(1),
(2) Date: Dec. 2, 2020

(87) PCT Pub. No.: WO2020/026492
PCT Pub. Date: Feb. 6, 2020

(65) Prior Publication Data
US 2021/0362782 A1 Nov. 25, 2021

(30) Foreign Application Priority Data
Jul. 31, 2018 (JP) .................................. 2018-143551

(51) Int. Cl.
*B62D 7/00* (2006.01)
*B62D 7/15* (2006.01)
(52) U.S. Cl.
CPC .................... *B62D 7/159* (2013.01)
(58) Field of Classification Search
CPC ........ B62D 7/159; B62D 6/008; B62D 6/003; B62D 6/002; B62D 5/0463; B62D 6/04;
(Continued)

(56) References Cited

U.S. PATENT DOCUMENTS 10,759,472 B2 * 9/2020 Kodera ................. B62D 5/0478
2020/0139822 A1 * 5/2020 Kaneko ................... B60L 15/20

FOREIGN PATENT DOCUMENTS

DE    10 2011 016 633 A1    10/2012
JP         H02-030770 U      2/1990
(Continued)

OTHER PUBLICATIONS

Office Action issued in corresponding German Application No. 112019002419.1 dated Oct. 26, 2022 with English machine translation (11 pages).
(Continued)

*Primary Examiner* — Ian Jen
(74) *Attorney, Agent, or Firm* — Foley & Lardner LLP

(57) ABSTRACT

Provided is a steering control device and a steering control method that can suppress the deterioration of the turning responsiveness at the initial stage of steering that may occur in a four-wheel steering vehicle and improve the steering stability when the front and rear wheels of the four-wheel steering vehicle are controlled in the same phase. A steering control device 1 of a vehicle that controls a rear wheel steering angle based on a front wheel steering angle includes a control unit 19 that controls an amount obtained by dividing an integrated value of a change in the rear wheel steering angle in a second steering section where an absolute value of the front wheel steering angle is constant and/or decreases by a time to be larger than an amount obtained by dividing an integrated value of a change in the rear wheel steering angle in a first steering section where the absolute value of the front wheel steering angle increases by a time.

16 Claims, 13 Drawing Sheets

(58) Field of Classification Search
CPC ... B62D 12/00; B60T 2201/16; B60T 8/1755; B60T 8/17552; B60T 2270/86; B60W 10/20; B60W 30/045
See application file for complete search history.

(56) References Cited

FOREIGN PATENT DOCUMENTS

| | | |
|---|---|---|
| JP | H02-234881 A | 9/1990 |
| JP | H04-339076 A | 11/1992 |
| JP | 2008-110707 A | 5/2008 |

OTHER PUBLICATIONS

International Search Report with English translation and Written Opinion issued in corresponding application No. PCT/JP2019/008207 dated May 14, 2019.

* cited by examiner

FIG. 5
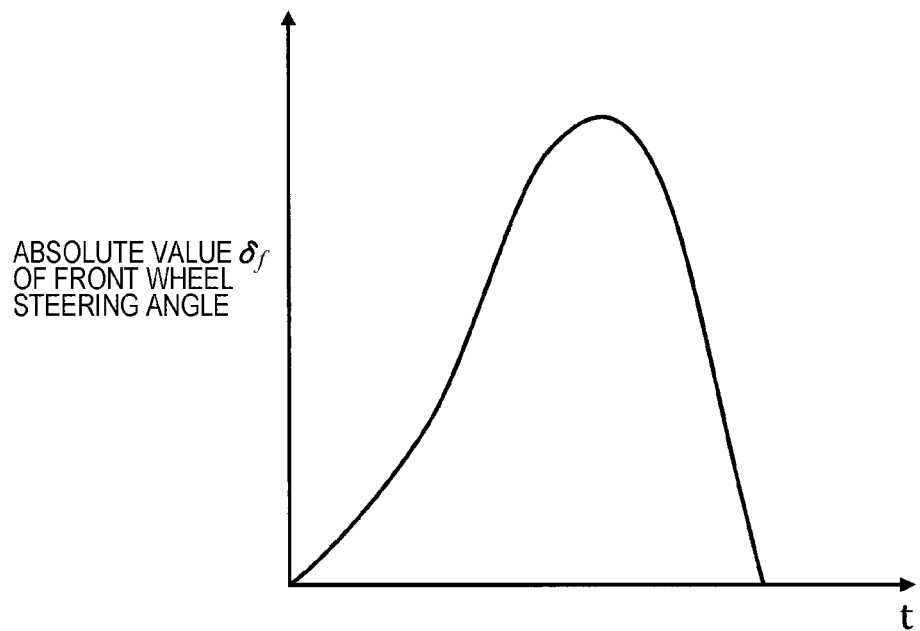
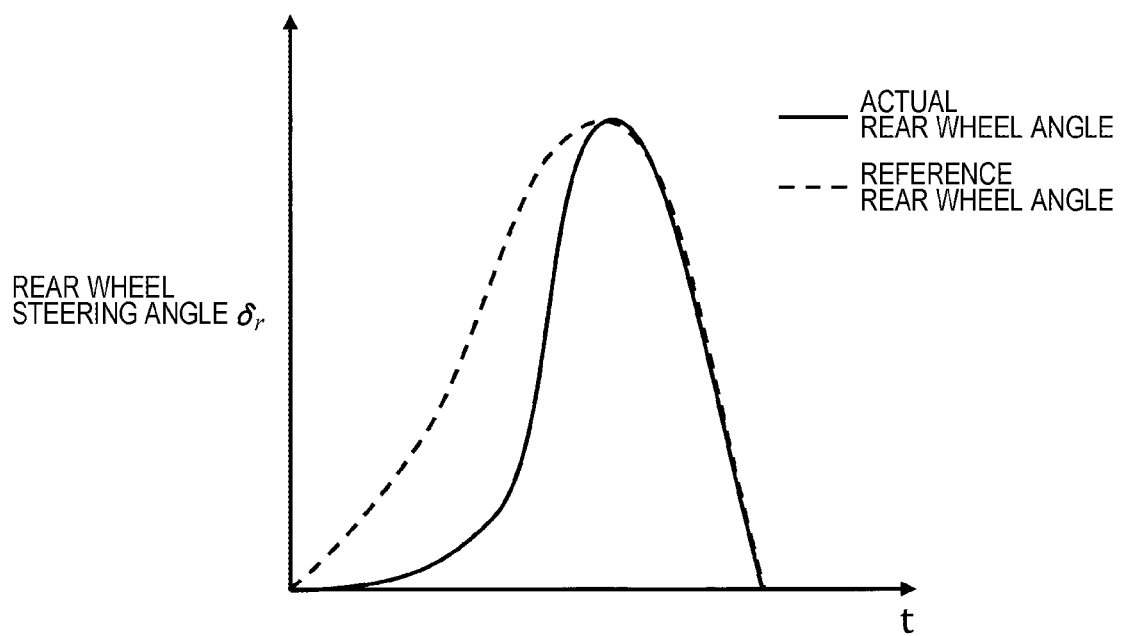

FIG. 6
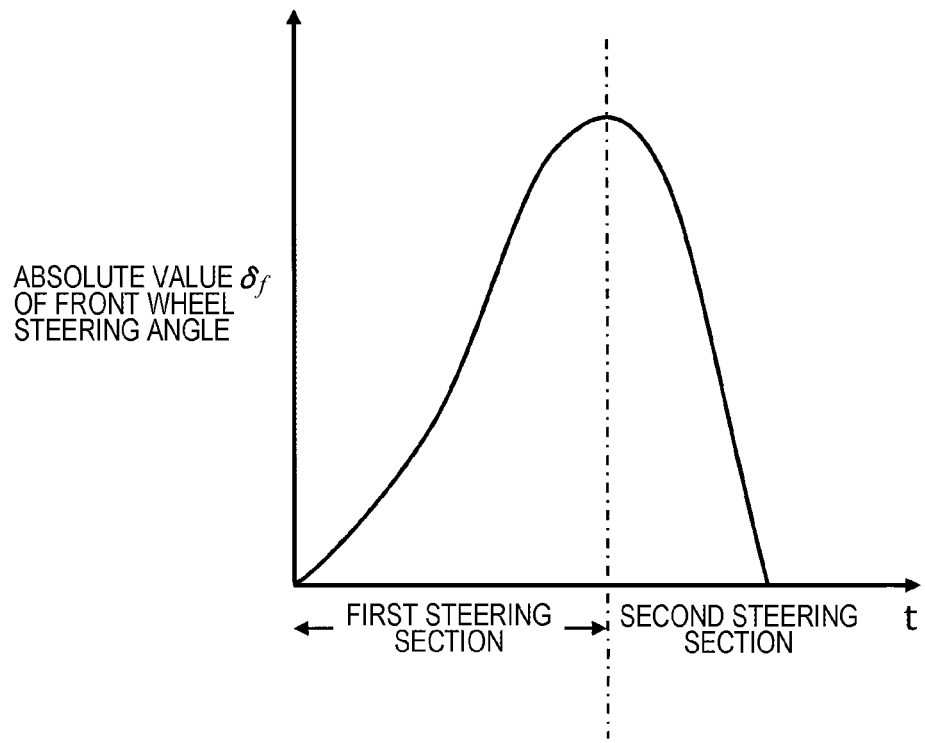
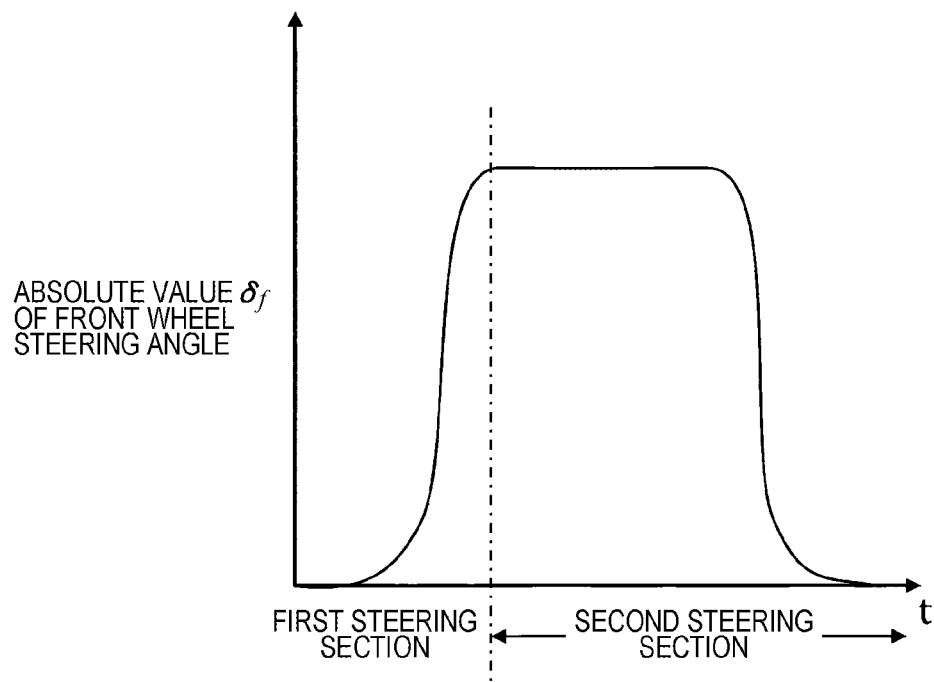

FIG. 8
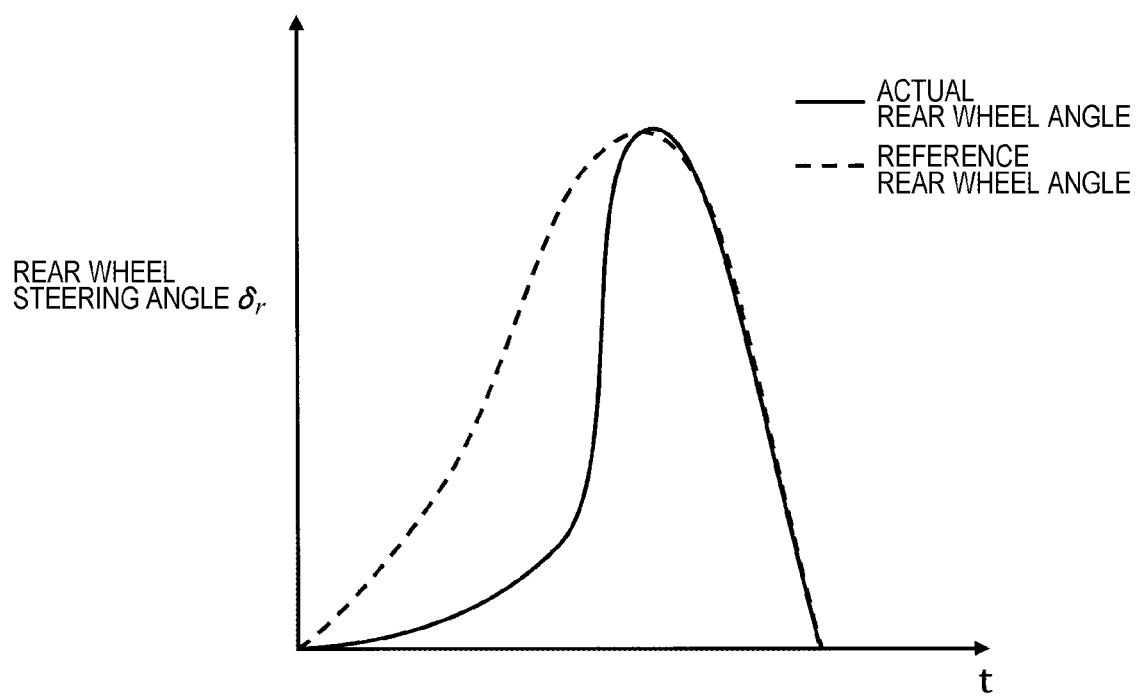
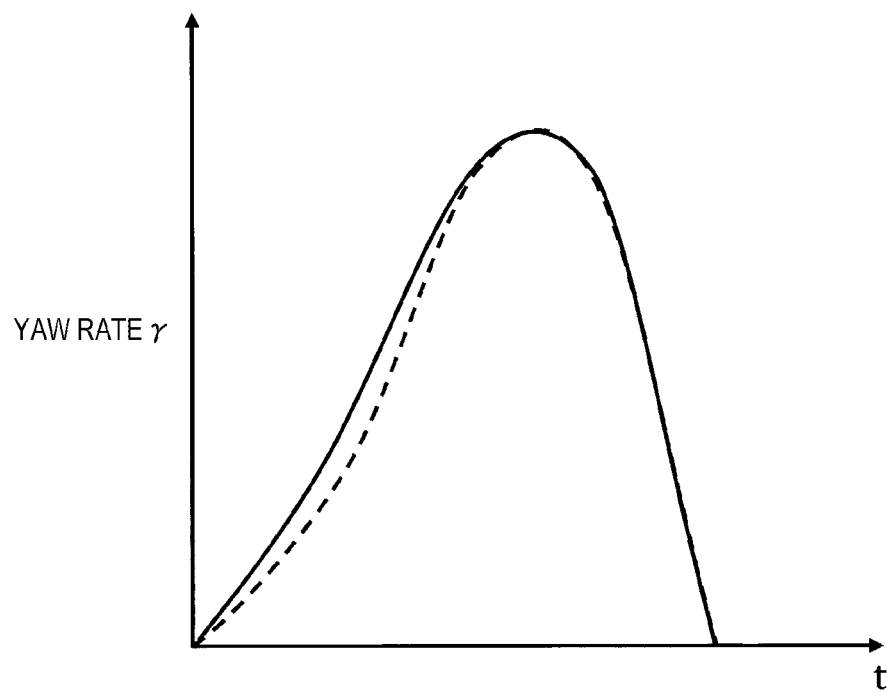

FIG. 10
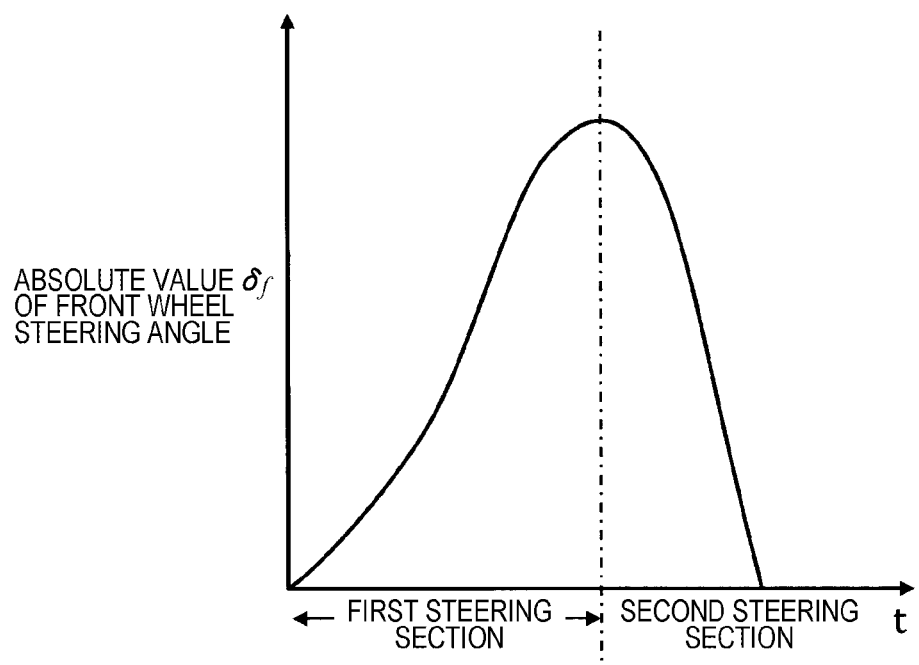
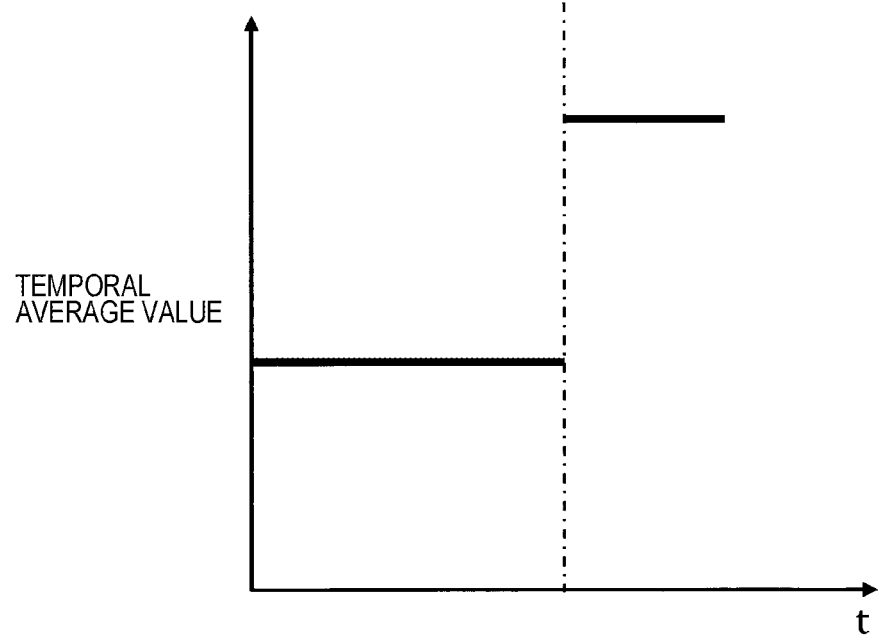

STEERING CONTROL DEVICE AND STEERING CONTROL METHOD

TECHNICAL FIELD

The present invention relates to a steering control device for a four-wheel steering vehicle, which is related to steering control of a vehicle and is particularly characterized by rear wheel control.

BACKGROUND ART

A four-wheel steering device that steers not only the front wheels but also the rear wheels is known in order to improve operability and stability during turning. It is generally known that in a four-wheel steering device, the rear wheels are controlled to be in phase opposite to those of the front wheels when the vehicle speed is low, and the rear wheels are controlled to be in phase with the front wheels when the vehicle speed is high. It is known that when the rear wheels are cut in phase with the front wheels, a yaw rate rises slowly and the turning responsiveness deteriorates as compared with the case where only the front wheels are steered.

Therefore, the technique described in PTL 1 has been proposed. In PTL 1, when the rear wheels are controlled to be in phase with the front wheels, the turning responsiveness is improved by delaying the phase of the rear wheels with respect to the front wheels.

CITATION LIST

Patent Literature

PTL 1: JP 2008-110707 A

SUMMARY OF INVENTION

Technical Problem

However, in PTL 1, there is a concern that a phase difference occurs between the front wheel steering angle and the rear wheel steering angle in a turning back operation (end of turning) due to a waste time process, and the steering stability is impaired.

Therefore, the invention provides a steering control device and a steering control method that can suppress the deterioration of the turning responsiveness at the initial stage of steering that may occur in a four-wheel steering vehicle, and improve the steering stability when the front and rear wheels of the four-wheel steering vehicle are controlled in the same phase.

Solution to Problem

In order to solve the above problems, the steering control device according to the invention is a steering control device of a vehicle that controls a rear wheel steering angle based on a front wheel steering angle. The steering control device includes a control unit that controls an amount obtained by dividing an integrated value of a change in the rear wheel steering angle in a second steering section where an absolute value of the front wheel steering angle is constant and/or decreases by a time to be larger than an amount obtained by dividing an integrated value of a change in the rear wheel steering angle in a first steering section where the absolute value of the front wheel steering angle increases by a time.

Further, the steering control method according to the invention is a steering control method of a vehicle that controls a rear wheel steering angle based on a front wheel steering angle. The steering control method includes controlling an amount obtained by dividing an integrated value of a change in the rear wheel steering angle in a second steering section where an absolute value of the front wheel steering angle is constant and/or decreases by a time to be larger than an amount obtained by dividing an integrated value of a change in the rear wheel steering angle in a first steering section where the absolute value of the front wheel steering angle increases by a time.

Advantageous Effects of Invention

According to the invention, it is possible to provide a steering control device and a steering control method that can suppress the deterioration of the turning responsiveness at the initial stage of steering that may occur in the four-wheel steering vehicle and improve the steering stability when the front and rear wheels of the four-wheel steering vehicle are controlled in the same phase.

Objects, configurations, and effects besides the above description will be apparent through the explanation on the following embodiments.

BRIEF DESCRIPTION OF DRAWINGS

FIG. 5 is a diagram illustrating a temporal change of an absolute value of a front wheel steering angle and a diagram illustrating a temporal change of a rear wheel steering angle, in which a temporal change of a reference rear wheel angle and a temporal change of an actual rear wheel angle $\delta re$ illustrated.

FIG. 6 is a diagram illustrating a temporal change of an absolute value of the front wheel steering angle, in which a first steering section where the absolute value of the front wheel steering angle increases and a second steering section where the absolute value of the front wheel steering angle decreases and/or becomes constant are illustrated.

FIG. 8 is a diagram illustrating a temporal change of a rear wheel steering angle and a temporal change of a yaw rate, in which a temporal change of the actual rear wheel angle together with a temporal change of the reference rear wheel angle $\delta re$ illustrated respectively.

FIG. 10 is a diagram illustrating a temporal change of an absolute value of the front wheel steering angle, in which a temporal average value of the amount of change in the rear wheel steering angle in the first steering section and the second steering section are illustrated.

DESCRIPTION OF EMBODIMENTS

In the present specification, a "rear wheel steering amount" includes both the rear wheel steering angle itself and the amount of change with respect to the rear wheel steering angle.

Hereinafter, embodiments of the invention will be described using the drawings.

First Embodiment

Figure 1:
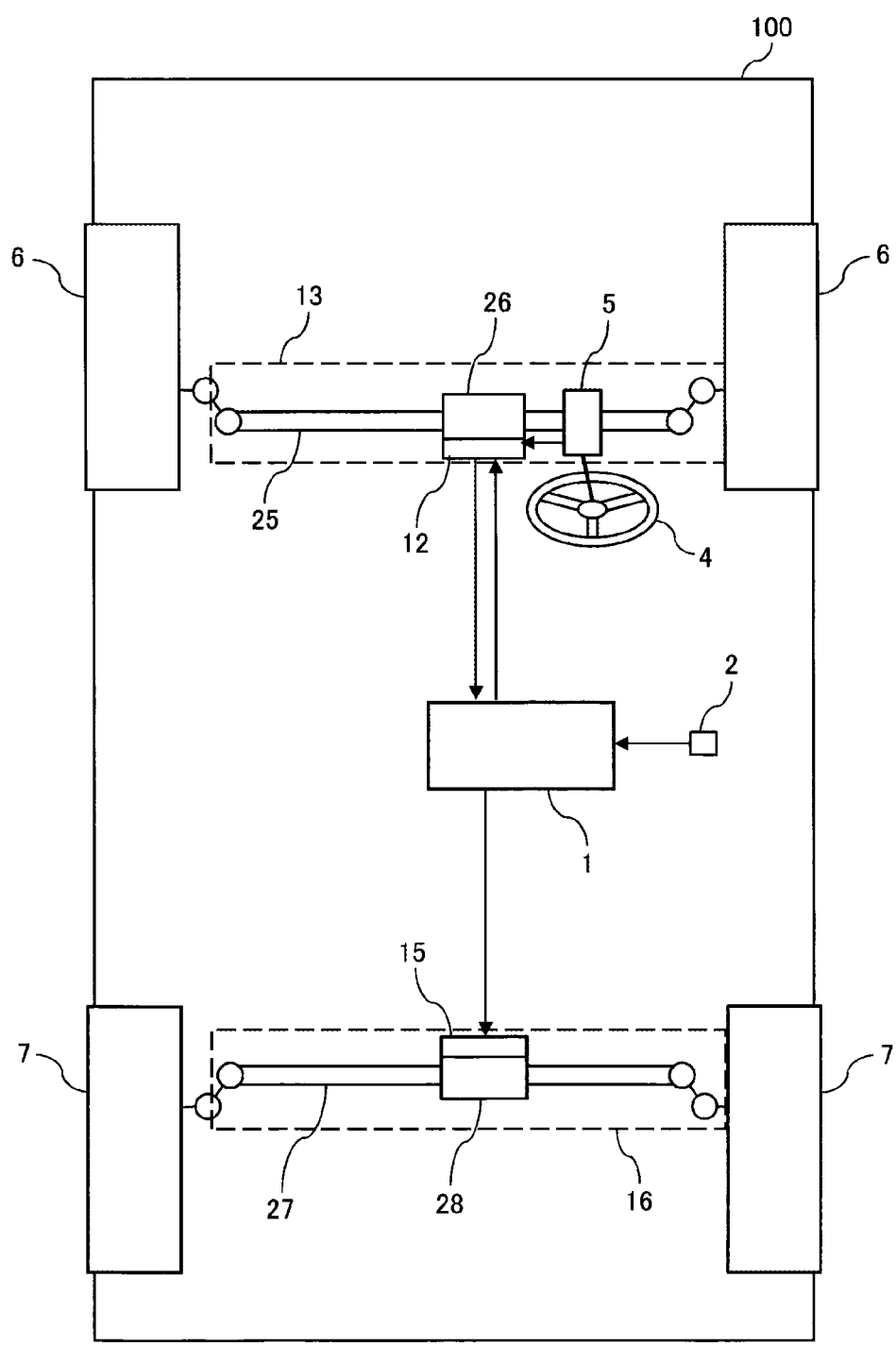
FIG. 1 is an overall schematic configuration diagram of a vehicle to which a steering control device of a first embodiment according to an embodiment of the invention is applied.

FIG. 1 is an overall schematic configuration diagram of a vehicle to which a steering control device of a first embodiment according to an embodiment of the invention is applied. As illustrated in FIG. 1, a vehicle 100 is a four-wheel steering (4WS) type vehicle capable of steering both front wheels 6 and rear wheels 7. The vehicle 100 includes a steering control device 1 that transmits commands to each control unit such as a front wheel steering angle control unit 12 that drives and controls an actuator 26 and a rear wheel steering angle control unit 15 that drives and controls an actuator 28 via a communication line, a vehicle state sensor 2 that acquires motion state information of the vehicle 100, and a communication line that transmits a signal from the vehicle state sensor 2 to the steering control device 1 or each control unit.

The actuator 26 includes a front wheel power steering device 13. The actuator 28 includes a rear wheel power steering device 16. A braking device (not illustrated), a vehicle drive system, and the like are included in the actuator. As the actuator, a hydraulic type or an electric type can be used.

The control unit includes a brake control unit and a drive torque control unit (not illustrated) in addition to the front wheel steering angle control unit 12 and the rear wheel steering angle control unit 15 described above.

The front wheel power steering device 13 includes the steering wheel 4, the steering sensor 5 such as a torque sensor for detecting the steering direction and the torque from the steering wheel 4 and a steering angle sensor for detecting a steering angle, a rack shaft 25 that is connected to the front wheel 6 by the link, the actuator 26 that applies thrust to the rack shaft 25, and the front wheel steering angle control unit 12 that gives a command to the actuator 26 based on the detection value of the steering sensor 5.

The rear wheel power steering device 16 includes a rack shaft 27 connected to the rear wheel 7 via a link, an actuator 28 for applying thrust to the rack shaft 27, and the rear wheel steering angle control unit 15 that gives a command to the actuator 28 based on the command from the steering control device 1.

The front wheel power steering device 13 is configured to generate thrust by the actuator 26 based on the torque and/or steering angle that is generated when the driver steers the steering wheel 4 and is detected by the steering sensor 5, and to assist the driver's input to steer the front wheel 6.

The front wheel power steering device 13 can also use a steer-by-wire system in which the actuator 26 is independent of the driver's operation. The steering control device 1 gives the steering angle command to the front wheel steering angle control unit 12 based on the information of the steering wheel 4, the steering direction from the steering wheel 4, and the steering sensor 5 such as the torque sensor that detects the torque and the steering angle sensor that detects the steering angle. Since it is a steer-by-wire system, the command is given independently of the driver's operation.

On the other hand, the rear wheel power steering device 16 is configured to generate thrust by the actuator 28 and steer the rear wheel 7 based on the command of the steering control device 1 independently of the steering of the driver's steering wheel 4.

In this embodiment, it is assumed that the left and right wheels of both the front wheels 6 and the rear wheels are steered by the same angle, but the left and right wheels (four wheels) of the front wheels 6 and the rear wheels 7 may be controlled in steering independently.

Next, the processing procedure of the steering control device 1 will be described with reference to the flowchart and the operation example.

Figure 2:
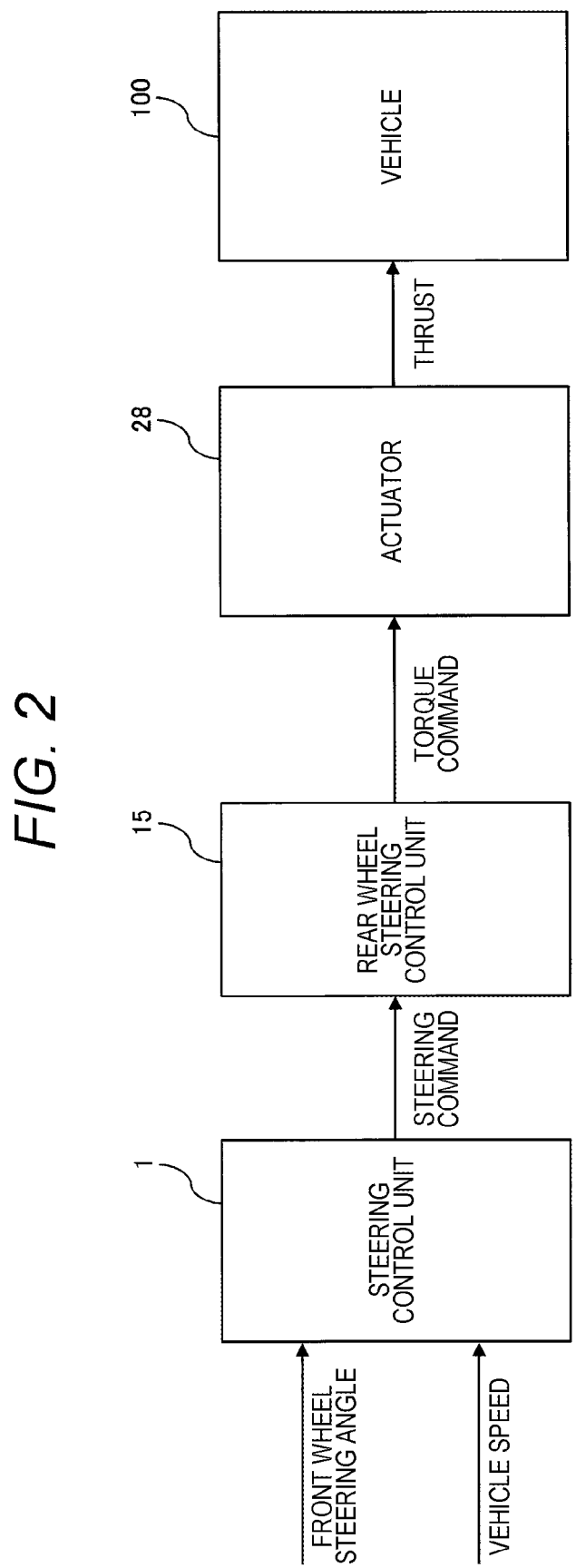
FIG. 2 is an operation explanatory view of the steering control device illustrated in FIG. 1.

FIG. 2 is an operation explanatory view of the steering control device 1 illustrated in FIG. 1. As illustrated in FIG. 2, when the vehicle 100 is traveling, the steering control device 1 receives the front wheel steering angle detected by the steering sensor 5 and the vehicle speed included in the motion state information of the vehicle 100 detected by the vehicle state sensor 2. Then, the steering control device 1 outputs a predetermined steering angle command to the rear wheel steering angle control unit 15 based on the received front wheel steering angle and vehicle speed. The rear wheel steering angle control unit 15 outputs a torque command to the actuator 28 based on a predetermined steering angle command input from the steering control device 1. The thrust generated by the actuator 28 changes the motion state of the vehicle 100. Here, the actuator 28 is, for example, the above-mentioned rear wheel power steering device 16 or a rear wheel power steering motor.

Figure 3:
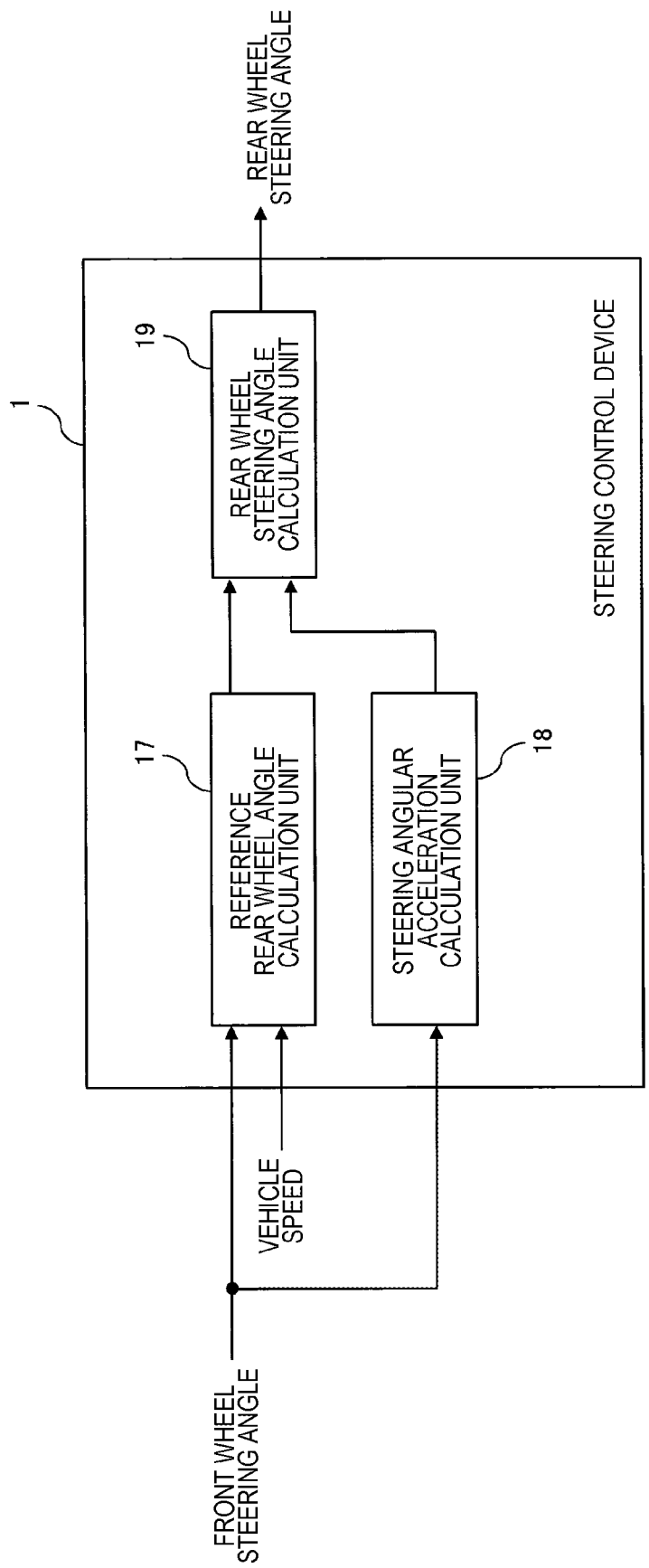
FIG. 3 is a block diagram of the steering control device according to the first embodiment.

FIG. 3 is a block diagram of the steering control device 1 according to this embodiment. As illustrated in FIG. 3, the steering control device 1 is configured by a reference rear wheel angle calculation unit 17, a steering angular acceleration calculation unit 18, and a rear wheel steering angle calculation unit 19. The reference rear wheel angle calculation unit 17, the steering angular acceleration calculation unit 18, and the rear wheel steering angle calculation unit 19 are, for example, realized by a processor such as a CPU (Central Processing Unit) (not illustrated), a ROM for storing various programs, a RAM for temporarily storing data generated in the process of calculation, and a storage device such as an external storage device. The processor such as the CPU reads out and executes various programs stored in the ROM, and stores the calculation result that is an execution result in the RAM or an external storage device. Although the explanation is divided into functional blocks for the sake of clarity, the reference rear wheel angle calculation unit 17, the steering angular acceleration calculation unit 18, and the rear wheel steering angle calculation unit 19 may be combined into one calculation unit. Alternatively, the configuration may be such that two desired functional blocks of the reference rear wheel angle calculation unit 17, the steering angular acceleration calculation unit 18, and the rear wheel steering angle calculation unit 19 are integrated.

The reference rear wheel angle calculation unit 17 forming the steering control device 1 receives the front wheel steering angle detected by the steering sensor 5 and the vehicle speed included in the motion state information of the vehicle 100 detected by the vehicle state sensor 2. Then, the reference rear wheel angle calculation unit 17 calculates the reference rear wheel angle based on the received front wheel steering angle and vehicle speed, and outputs the calculated reference rear wheel angle to the rear wheel steering angle calculation unit 19 described later.

The steering angular acceleration calculation unit 18 forming the steering control device 1 receives the front wheel steering angle detected by the steering sensor 5. Then, the steering angular acceleration calculation unit 18 calculates the steering angular acceleration based on the received front wheel steering angle, and outputs the calculated steering angular acceleration to the rear wheel steering angle calculation unit 19 described later.

The rear wheel steering angle calculation unit 19 forming the steering control device 1 determines the rear wheel steering amount based on the reference rear wheel angle input from the reference rear wheel angle calculation unit and the steering angular acceleration input from the steering angular acceleration calculation unit 18. In other words, the rear wheel steering angle calculation unit 19 calculates the rear wheel steering angle based on the reference rear wheel angle and the steering angular acceleration. The steering angle of the rear wheel 7 is set smaller than the steering angle of the front wheel 6. Here, instead of the vehicle speed (the speed of a vehicle) input to the reference rear wheel angle calculation unit 17, the vehicle wheel speed of each wheel may be detected and input to the reference rear wheel angle calculation unit 17.

Next, a detailed processing procedure of the steering control device 1 according to this embodiment will be described with reference to FIGS. 4 to 9.

Figure 4:
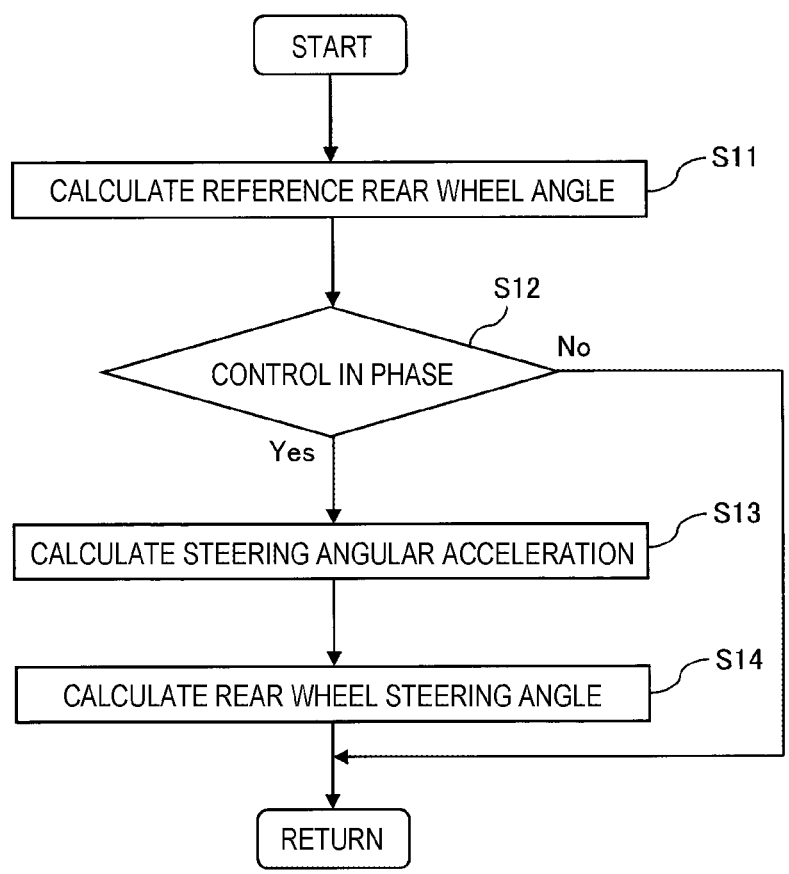
FIG. 4 is a flowchart illustrating an operation flow of the steering control device according to the first embodiment.

FIG. 4 is a flowchart illustrating an operation flow of the steering control device 1 according to the first embodiment.

As illustrated in FIG. 4, in Step S11, the reference rear wheel angle calculation unit 17 forming the steering control device 1 calculates the reference rear wheel angle based on the front wheel steering angle detected by the steering sensor 5 and the vehicle speed included in the motion state information of the vehicle 100 detected by the vehicle state sensor 2. When the vehicle speed range is equal to or less than a certain threshold, the rear wheels 7 are steered in the opposite phase of the front wheels 6, and when the vehicle speed range is equal to or more than a certain threshold, the rear wheels 7 are controlled to be in the same phase as the front wheels 6. If the vehicle speed is constant and equal to or more than a certain threshold, the waveform of the rear wheel reference angle often has a relationship of similar waveform to the front wheel steering angle which is input information.

In Step S12, the reference rear wheel angle calculation unit 17 determines whether the rear wheel reference angle is in phase with the front wheel steering angle (in-phase control). As a result of the determination, if the rear wheel reference angle is in phase with the front wheel steering angle, the process proceeds to Step S13. On the other hand, as a result of the determination, when the rear wheel reference angle is in opposite phase of the front wheel steering angle, the process ends with the calculated reference rear wheel angle as a command value given to the rear wheel steering angle control unit 15.

In Step S13, the steering angular acceleration calculation unit 18 forming the steering control device 1 calculates the front wheel steering angular speed $\omega$ (=d$\delta$f/dt) and the front wheel steering angular acceleration $\omega'$ (=d$^2\delta$f/dt$^2$) using the absolute value $\delta$f of the front wheel steering angle (in this specification, the front wheel steering angular acceleration, which is the second derivative of the absolute value $\delta$f of the front wheel steering angle, is noted as $\omega'$ for convenience). By using the absolute value $\delta$f of the front wheel steering angle, both the steering angular speed and the steering angular acceleration at the start of turning take positive values for both left and right turns.

In Step S14, the rear wheel steering angle calculation unit 19 forming the steering control device 1 adjusts the amount of change in the rear wheel steering angle or the gain to be applied to the reference rear wheel angle based on the amount of change in the front wheel steering angle and the positive/negative values of the front wheel steering angular acceleration $\omega'$ calculated by the steering angular acceleration calculation unit 18 in Step S13. Since the purpose is to control the rear wheel 7 in phase with the front wheel 6, when multiplying the reference rear wheel angle by the gain, a positive value including zero (0) is used. Here, the adjustment of the amount of change in the rear wheel steering angle based on the positive/negative values of the front wheel steering angular acceleration $\omega'$ will be described with reference to FIG. 5. FIG. 5 is a diagram illustrating a temporal change of an absolute value $\delta$f of a front wheel steering angle and a diagram illustrating a temporal change of a rear wheel steering angle $\delta$r, in which a temporal change of a reference rear wheel angle and a temporal change of an actual rear wheel angle $\delta$re illustrated. The temporal change of the absolute value $\delta$f of the front wheel steering angle illustrated in the upper part of FIG. 5 is the waveform of the absolute value $\delta$f of the front wheel steering angle used by the steering angular acceleration calculation unit 18 to calculate the front wheel steering angular acceleration $\omega'$ in Step S13. In the lower part of FIG. 5, the dotted line represents the temporal change of the reference rear wheel angle, and the solid line represents the actual rear wheel angle. As illustrated in the lower part of FIG. 5, the rear wheel steering angle calculation unit 19 adjusts the rear wheel steering angle $\delta$r to be the actual rear wheel angle illustrated by the solid line based on the amount of change in the front wheel steering angle and the positive/negative values of the front wheel steering angular acceleration $\omega'$ calculated by the steering angular acceleration calculation unit 18 in Step S13.

Figure 7:
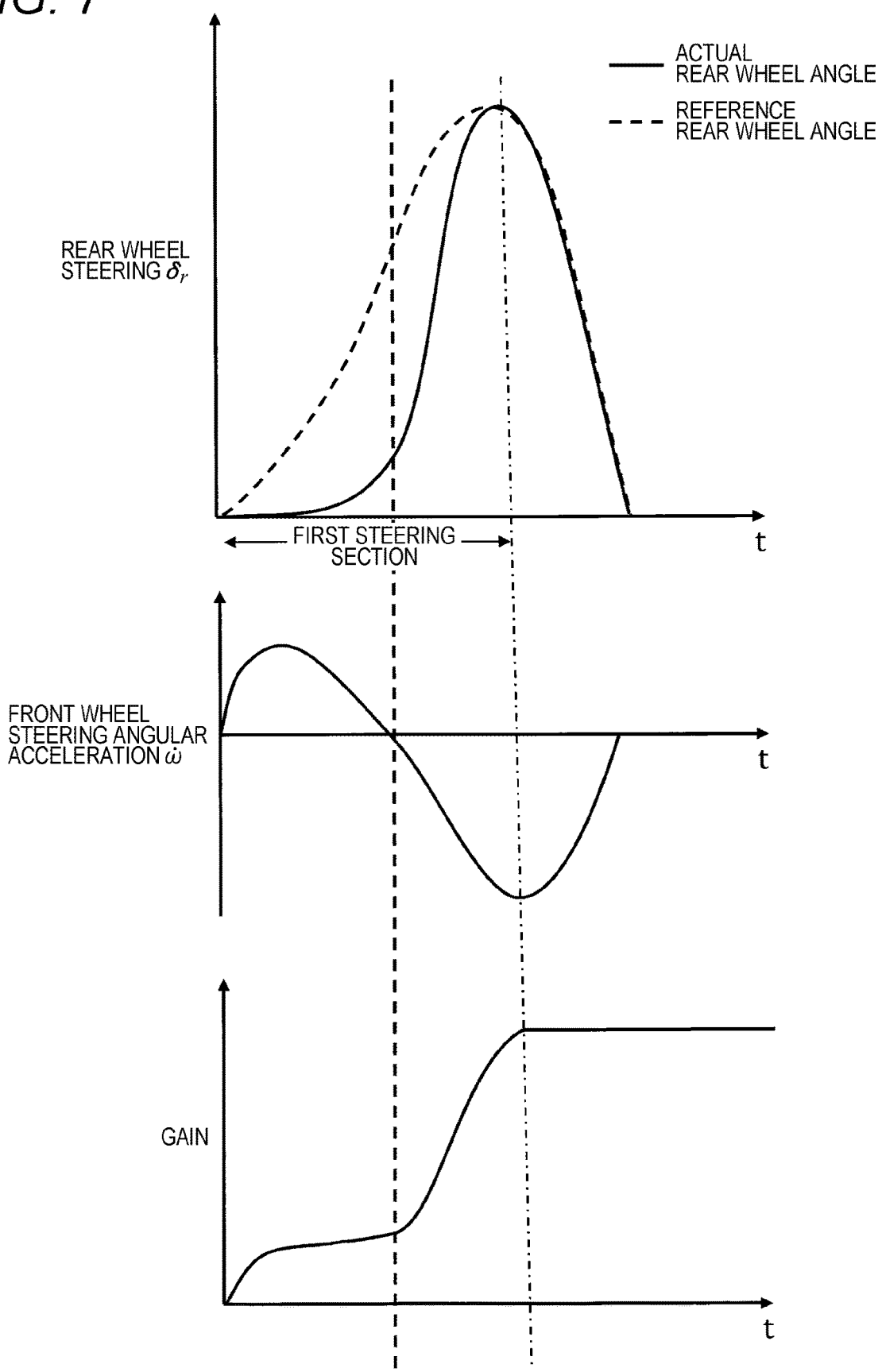
FIG. 7 is a diagram illustrating changes over time in rear wheel steering angle, front wheel steering angular acceleration, and gain.

Next, the details of Step S14 will be described with reference to FIGS. 6 and 7. FIG. 6 is a diagram illustrating the temporal change of the absolute value of the front wheel steering angle, in which a first steering section where the absolute value of the front wheel steering angle increases and a second steering section where the absolute value of the front wheel steering angle decreases and/or becomes constant are illustrated. FIG. 7 is a diagram illustrating changes over time in rear wheel steering angle, front wheel steering angular acceleration, and gain.

As illustrated in FIG. 6, the section where the absolute value $\delta$f of the front wheel steering angle increases is referred to as the first steering section, and the section where the absolute value $\delta$f of the front wheel steering angle decreases and/or becomes constant is referred to as the second steering section. The temporal change of the absolute value $\delta$f of the front wheel steering angle illustrated in the upper part of FIG. 6 is represented as a waveform in which the absolute value $\delta$f of the front wheel steering angle increases in the first steering section, and the absolute value $\delta$f of the front wheel steering angle decreases in the second steering section. Such a waveform (profile) corresponds to, for example, a steering operation in the case of performing emergency avoidance, and corresponds to a state in which the steering is immediately returned after turning the steering to a different lane.

Further, the temporal change of the absolute value δf of the front wheel steering angle illustrated in the lower part of FIG. 6 is represented as a waveform in which the absolute value δf of the front wheel steering angle increases in the first steering section, the absolute value δf of the front wheel steering angle is constant for a predetermined period in the second steering section, and then the absolute value δf of the front wheel steering angle decreases. Such a waveform (profile) corresponds to, for example, a steering operation while traveling on a ramp on a highway. Since the highway ramp is a curve with a constant radius, the steering is maintained for a certain period of time, after which the steering is returned. It corresponds to the waveform at this time. That is, the section where the absolute value δf of the front wheel steering angle is constant in the lower part of FIG. 6 corresponds to the state in which the above-mentioned steering state is maintained for a certain period of time.

As illustrated in FIG. 7, the rear wheel steering angle calculation unit 19 forming the steering control device 1 adjusts the amount of change in the rear wheel steering angle δr based on the positive/negative values of the front wheel steering angular acceleration ω' in the first steering section (the temporal change of the rear wheel steering angle δr in the upper part of FIG. 7), and increases the amount of change in the rear wheel steering angle δr when the front wheel steering angular acceleration ω' is negative compared to the case when the front wheel steering angular acceleration ω' is positive. When the gain is used, it is multiplied by the reference rear wheel angle (the dotted line illustrated in the upper part of FIG. 7) and the gain value is adjusted as illustrated in the lower part of FIG. 7. As a result, the rear wheel steering angle δr (the solid line illustrated in the upper part of FIG. 7) at the start of turning (steering) becomes smaller than the reference rear wheel angle (the dotted line illustrated in the upper part of FIG. 7), so the force generated by the rear wheel 7 becomes smaller and the amount of restoring yaw moment that suppresses the rotating motion of the vehicle 100 is also reduced. As a result, even in the vehicle 100 in which the four wheels are controlled, the yaw rate γ rises faster and the deterioration of the turning responsiveness can be suppressed. Further, by using the front wheel steering angular acceleration ω', it is possible to cope with a sudden increase in steering during steering.

Here, FIG. 8 is a diagram illustrating the temporal change of the rear wheel steering angle δr and the temporal change of the yaw rate γ, in which the temporal change of the actual rear wheel angle together with the temporal change of the reference rear wheel angle δre illustrated respectively. As illustrated in the solid line waveform in the lower part of FIG. 8, it can be seen that even in the vehicle 100 in which the four wheels are controlled, the yaw rate γ rises faster and the deterioration of the turning responsiveness can be suppressed.

In the first steering section, the amount of change (gain) of the rear wheel steering angle δr may be adjusted based on the front wheel steering angle, the front wheel steering angular speed ω, the front wheel steering angular acceleration ω', and the like within a range, where the positive/negative values of the steering angular acceleration are matched. At that time, in order to ensure that the turning performance is not deteriorated at the initial stage of turning (steering), the amount of change (gain) of the rear wheel steering angle δr also changes to be larger as the region changes from a region where the absolute value δf of the front wheel steering angle is small to a region where the absolute value is large.

Figure 9:
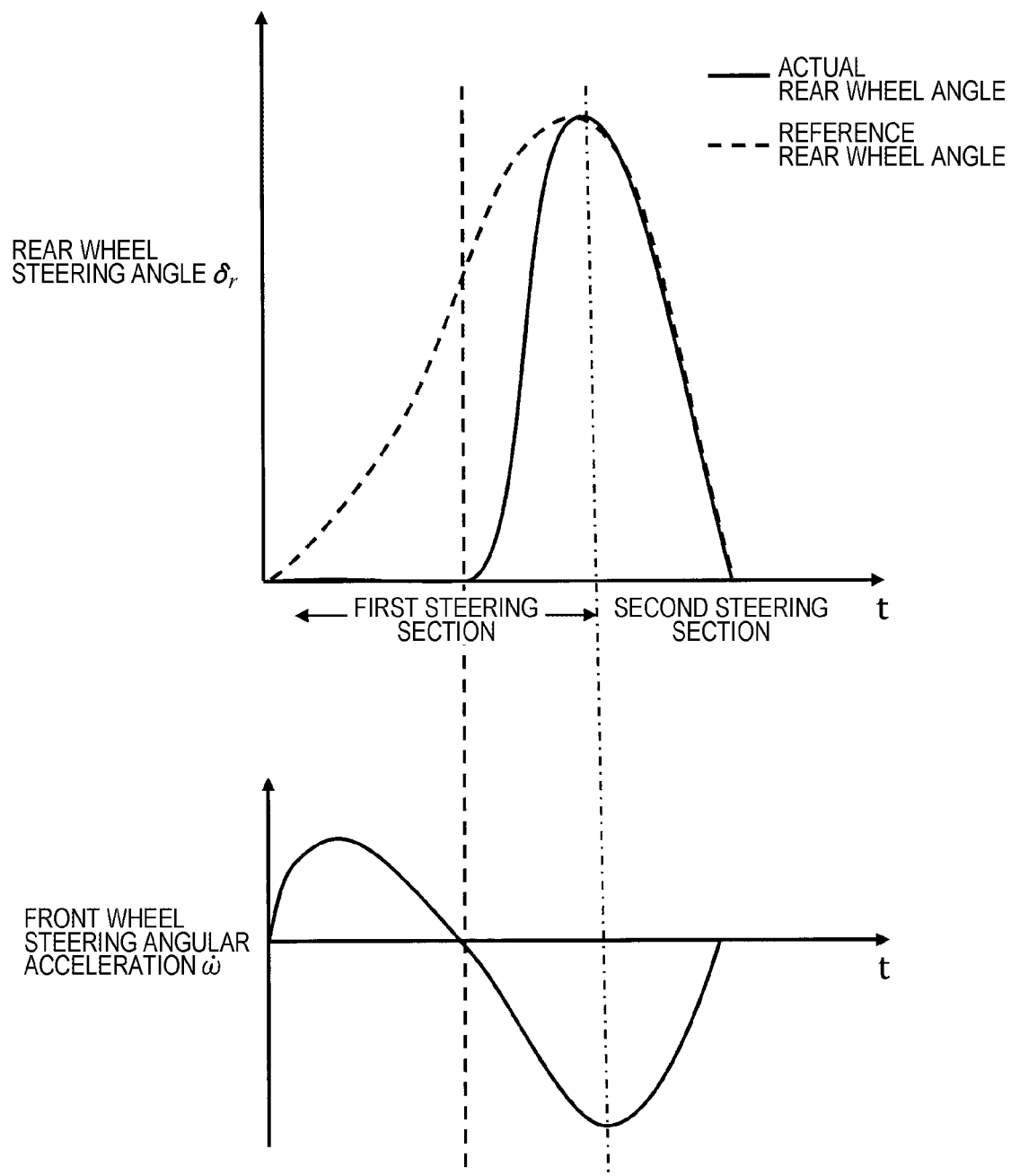
FIG. 9 is a diagram illustrating the temporal change of the rear wheel steering angle and the temporal change of the front wheel steering angular acceleration.

Further, FIG. 9 illustrates the temporal change of the rear wheel steering angle δr and the temporal change of the front wheel steering angular acceleration ω'. As illustrated in FIG. 9, the rear wheel steering angle δr may be controlled from a state in which the front wheel steering angular acceleration ω' in the first steering section is negative, or from the second steering section. By performing such control, the first half of the first steering section (the section in which the front wheel steering angular acceleration ω' is positive) becomes 2WS, and the characteristics of the vehicle 100 are directly reflected in the behavior.

When dividing the first steering section into two regions, the yaw rate γ and a lateral acceleration Gy acquired from the vehicle state sensor 2 in combination with or in place of the front wheel steering angular acceleration ω', or the temporal change rate (time derivative) of their physical quantities may be used. Considering the delay of the actuator, the delay and accuracy of the vehicle state sensor 2, and the delay of the yaw rate γ and the lateral acceleration Gy with respect to the steering angle, it is considered that the most suitable physical quantity for grasping the vehicle condition in the future is the steering angle.

In the second steering section, the section in which the absolute value δf of the front wheel steering angle illustrated in FIG. 6 is constant and/or decreases is made to follow the rear wheel steering angle δr. That is, it is equivalent to determining the rear wheel steering angle δr by multiplying the front wheel steering angle by a constant gain. An operation example of the waveform of the rear wheel steering angle δr and the gain applied to the rear wheel reference angle in the second steering section is as illustrated in FIG. 7. Since the waveforms of the front wheel steering angle and the rear wheel steering angle δr are similar and no phase difference occurs, the stability of the vehicle 100 at the end of turning (steering) is improved.

FIG. 10 is a diagram illustrating the temporal change of the absolute value δf of the front wheel steering angle, in which the temporal average value of the amount of change in the rear wheel steering angle in the first steering section and the second steering section are illustrated. As illustrated in FIG. 10, in order to ensure non-deterioration of responsiveness at the initial stage of turning (steering) and steering stability of the vehicle 100, the temporal average value of the amount of change in the rear wheel steering angle δr in the first steering section for any front wheel steering pattern is needed to be smaller than the temporal average value of the amount of change in the rear wheel steering angle δr in the second steering section. Here, the temporal average value of the steering angle amount of change is the amount obtained by dividing the value obtained by time integration by the time.

The rear wheel steering angle calculation unit 19 transmits the rear wheel steering angle calculated in Step S14 in FIG. 4 to the rear wheel steering angle control unit 15 as a command value via the communication line, whereby the process of the steering control device 1 ends.

As described above, according to this embodiment, it is possible to provide a steering control device and a steering control method that can suppress the deterioration of the turning responsiveness at the initial stage of steering that may occur in the four-wheel steering vehicle, and improve the steering stability when the front and rear wheels of the four-wheel steering vehicle are controlled in the same phase.

Second Embodiment

Figure 11:
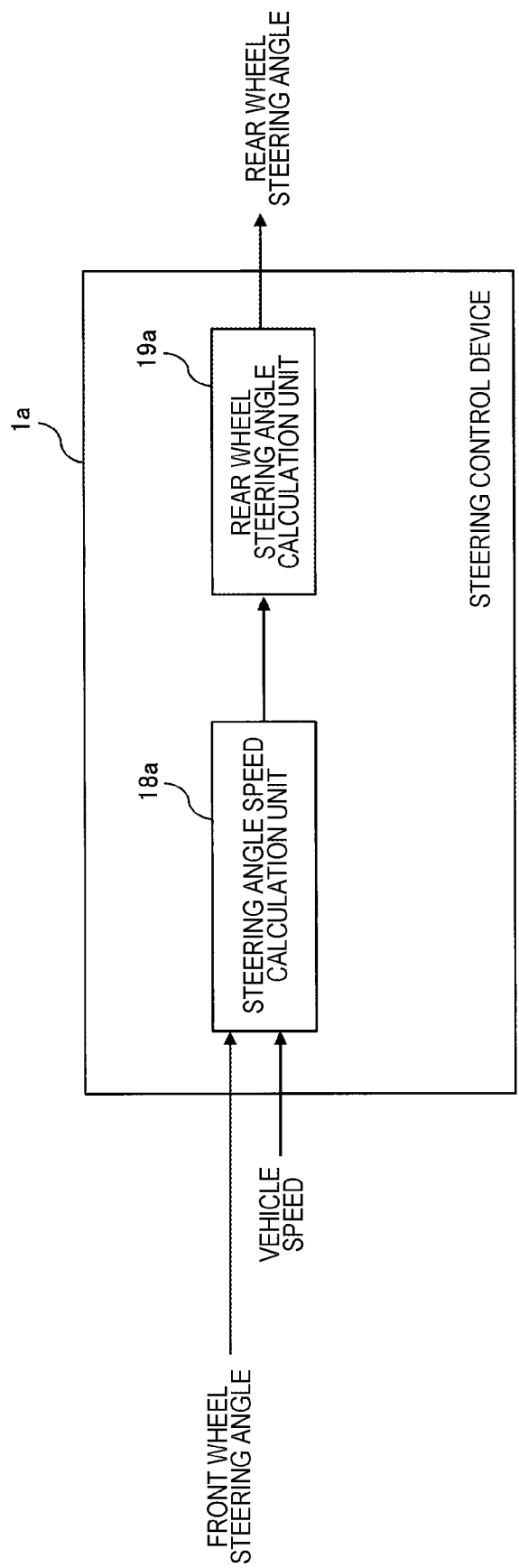
FIG. 11 is a block diagram of a steering control device of a second embodiment according to another embodiment of the invention.

FIG. 11 is a block diagram of a steering control device 1a of a second embodiment according to another embodiment of the invention. In the above-described first embodiment, the steering control device 1 is configured by the reference rear wheel angle calculation unit 17, the steering angular acceleration calculation unit 18, and the rear wheel steering angle calculation unit 19, but is different from this embodiment in that the steering control device 1a is configured by a steering angular speed calculation unit 18a and a rear wheel steering angle calculation unit 19a. The other configurations of the vehicle 100 are the same as those of the first embodiment.

As illustrated in FIG. 11, the steering control device 1a according to this embodiment is configured by the steering angular speed calculation unit 18a and the rear wheel steering angle calculation unit 19a. The steering angular speed calculation unit 18a and the rear wheel steering angle calculation unit 19a are, for example, realized by a processor such as a CPU (not illustrated), a ROM for storing various programs, a RAM for temporarily storing data generated in the process of calculation, and a storage device such as an external storage device. The processor such as a CPU reads out and executes various programs stored in the ROM, and stores the calculation result that is an execution result in the RAM or an external storage device. Although the explanation is divided into functional blocks for the sake of clarity, the steering angular speed calculation unit 18a and the rear wheel steering angle calculation unit 19a may be used as one calculation unit.

The steering angular speed calculation unit 18a forming the steering control device 1a receives the front wheel steering angle detected by the steering sensor 5 and the vehicle speed included in the motion state information of the vehicle 100 detected by the vehicle state sensor 2. Then, the steering angular speed calculation unit 18a calculates the front wheel steering angular speed based on the received front wheel steering angle, and outputs the calculated front wheel steering angular speed to the rear wheel steering angle calculation unit 19a.

The rear wheel steering angle calculation unit 19a forming the steering control device 1a receives the front wheel steering angle detected by the steering sensor 5 and the vehicle speed included in the motion state information of the vehicle 100 detected by the vehicle state sensor 2. Then, the rear wheel steering angle calculation unit 19a calculates the front wheel steering angular speed ω based on the received front wheel steering angle and the vehicle speed, and outputs the calculated front wheel steering angular speed co to the rear wheel steering angle calculation unit 19a described later.

The rear wheel steering angle calculation unit 19a forming the steering control device 1a determines the rear wheel steering amount based on the front wheel steering angular speed ω input from the steering angular speed calculation unit 18a. In other words, the rear wheel steering angle calculation unit 19a calculates the rear wheel steering angle based on the front wheel steering angular speed ω.

Next, a detailed processing procedure of the steering control device 1a according to this embodiment will be described with reference to FIGS. 12 and 13.

Figure 12:
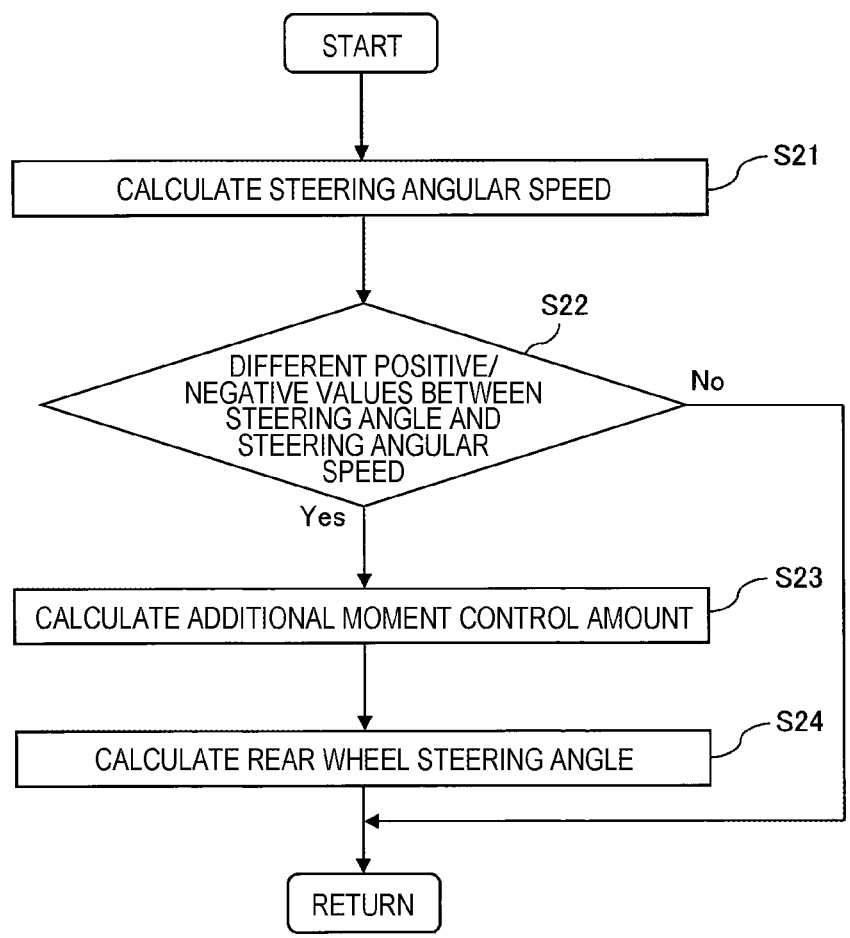
FIG. 12 is a flowchart illustrating an operation flow of the steering control device according to the second embodiment.
Figure 13:
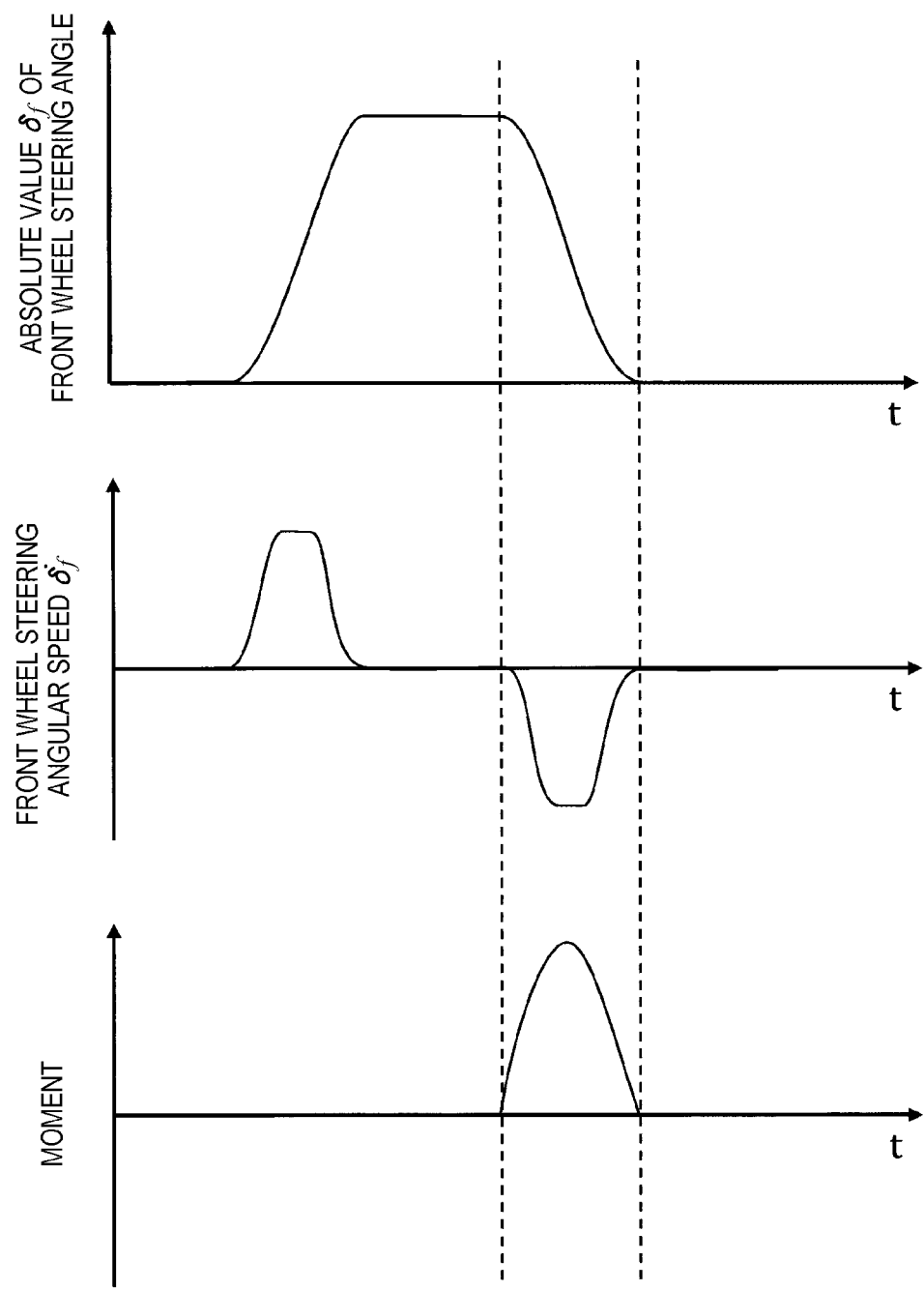
FIG. 13 is a diagram illustrating a temporal change of an absolute value of the front wheel steering angle, a front wheel steering angular speed, and a moment.

FIG. 12 is a flowchart illustrating an operation flow of the steering control device according to this embodiment.

As illustrated in FIG. 12, in Step S21, the steering angular speed calculation unit 18a forming the steering control device 1a calculates the front wheel steering angular speed ω based on the front wheel steering angle detected by the steering sensor 5 and the vehicle speed included in the motion state information of the vehicle 100 detected by the vehicle state sensor 2.

In Step S22, the steering angular speed calculation unit 18a compares the front wheel steering angle detected by the steering sensor 5 with the calculated positive/negative values of the front wheel steering angular speed ω, and if the positive/negative values are different, the process proceeds to Step S23. On the other hand, as a result of comparison, if the positive/negative values of the front wheel steering angle and the calculated front wheel steering angular speed ω match, the process ends. FIG. 13 is a diagram illustrating temporal changes of the front wheel steering angle, the front wheel steering angular speed, and the moment. As illustrated in FIG. 13, it illustrates that the rear wheels are controlled only in the region within the dotted line.

In Step S23, the rear wheel steering angle calculation unit 19a forming the steering control device 1a multiplies the front wheel steering angular speed ω by a proportional gain, calculates a value with a primary delay, and uses that value as an additional moment control amount.

In Step S24, the rear wheel steering angle calculation unit 19a calculates a required rear wheel steering amount (rear wheel steering angle) based on the additional moment control amount obtained in Step S23, and ends the process.

Similar to the first embodiment described above, this embodiment is premised on controlling the rear wheels 7 in phase with the front wheels 6. By performing such rear wheel steering, the restoring yaw moment acts on the vehicle 100 when the steering is returned, and the vehicle responsiveness and stability during turning (steering) are improved.

Instead of the front wheel steering angle and the front wheel steering angular speed ω, the motion state information of the vehicle 100 acquired from the vehicle state sensor 2 may be used. For example, when the lateral acceleration and the lateral acceleration increasing rate of the vehicle 100 are used and the positive/negative values of the two are different, the restoring yaw moment becomes a value obtained by adding a proportional gain and a primary delay to the lateral acceleration increasing rate.

As described above, according to this embodiment, in addition to the effect of the first embodiment, the restoring yaw moment acts on the vehicle when the steering is returned, and it is possible to improve the vehicle responsiveness and stability during turning (steering).

Further, the invention is not limited to the embodiments described above, but includes various modifications. For example, the above embodiments have been described in detail for easy understanding of the invention, and the invention is not necessarily limited to having all the configurations described. In addition, some of the configurations of a certain embodiment may be replaced with the configurations of the other embodiments, and the configurations of the other embodiments may be added to the configurations of the subject embodiment.

REFERENCE SIGNS LIST 1, 1a steering control device
2 vehicle state sensor
4 steering wheel
5 steering sensor 6 front wheel
7 rear wheel
12 front wheel steering angle control unit
13 front wheel power steering control device
14 monitoring sensor
15 rear wheel steering angle control unit
16 rear wheel power steering device
17 reference rear wheel angle calculation unit
18 steering angular acceleration calculation unit
18a steering angular speed calculation unit
19, 19a rear wheel steering angle calculation unit
25 rack shaft
26 actuator
27 rack shaft
28 actuator
100 vehicle

The invention claimed is:

1. A steering control device of a vehicle that controls a rear wheel steering angle based on a front wheel steering angle, comprising:
a control unit that controls an amount obtained by dividing an integrated value of a change in the rear wheel steering angle in a second steering section where an absolute value of the front wheel steering angle is constant and/or decreases by a time to be larger than an amount obtained by dividing an integrated value of a change in the rear wheel steering angle in a first steering section where the absolute value of the front wheel steering angle increases by a time.

2. The steering control device according to claim 1, wherein, in the first steering section, the control unit adjusts the amount of change in the rear wheel steering angle to be larger in a region where an acceleration of a change in an absolute value of the front wheel steering angle is negative than in a positive region.

3. The steering control device according to claim 1, wherein the control unit changes the rear wheel steering angle to follow the front wheel steering angle in the second steering section.

4. The steering control device according to claim 2, wherein the control unit includes
a rear wheel steering angle calculation unit that calculates the rear wheel steering angle by multiplying the front wheel steering angle by a proportional gain, and
wherein, in the first steering section, the proportional gain changes to be large as an absolute value of the steering angle changes to a region where the absolute value is large rather than a region where the absolute value is small.

5. The steering control device according to claim 4, wherein the proportional gain is a constant value in the second steering section.

6. The steering control device according to claim 1, wherein the control unit includes
a rear wheel steering angle calculation unit that obtains a moment control amount by multiplying a front wheel steering angular speed of the front wheel steering angle by a proportional gain, and calculates the rear wheel steering angle based on the obtained moment control amount.

7. The steering control device according to claim 6, wherein the control unit includes
a steering angular speed calculation unit that obtains a front wheel steering angular speed of the front wheel steering angle based on the front wheel steering angle and a vehicle speed of the vehicle.

8. A steering control method of a vehicle that controls a rear wheel steering angle based on a front wheel steering angle, comprising:
controlling an amount obtained by dividing an integrated value of a change in the rear wheel steering angle in a second steering section where an absolute value of the front wheel steering angle is constant and/or decreases by a time to be larger than an amount obtained by dividing an integrated value of a change in the rear wheel steering angle in a first steering section where the absolute value of the front wheel steering angle increases by a time.

9. The steering control method according to claim 8,
wherein, in the first steering section, the amount of change in the rear wheel steering angle is adjusted to be larger in a region where an acceleration of a change in an absolute value of the front wheel steering angle is negative than in a positive region.

10. The steering control method according to claim 8,
wherein the rear wheel steering angle is changed to follow the front wheel steering angle in the second steering section.

11. The steering control method according to claim 9,
wherein the rear wheel steering angle is calculated by multiplying the front wheel steering angle by a proportional gain, and
wherein, in the first steering section, the proportional gain changes to be large as an absolute value of the steering angle changes to a region where the absolute value is large rather than a region where the absolute value is small.

12. The steering control method according to claim 11,
wherein the proportional gain is a constant value in the second steering section.

13. The steering control method according to claim 8,
wherein a moment control amount is obtained by multiplying a front wheel steering angular speed of the front wheel steering angle by a proportional gain, and the rear wheel steering angle is calculated based on the obtained moment control amount.

14. The steering control method according to claim 13,
wherein a front wheel steering angular speed of the front wheel steering angle is obtained based on the front wheel steering angle and a vehicle speed of the vehicle.

15. The steering control device according to claim 2,
wherein the control unit changes the rear wheel steering angle to follow the front wheel steering angle in the second steering section.

16. The steering control method according to claim 9,
wherein the rear wheel steering angle is changed to follow the front wheel steering angle in the second steering section.

* * * * *